Feb. 27, 1923.
H. T. PIERSON.
GUARD FOR MOTOR HOUSINGS.
FILED APR. 22, 1920.
1,447,034.
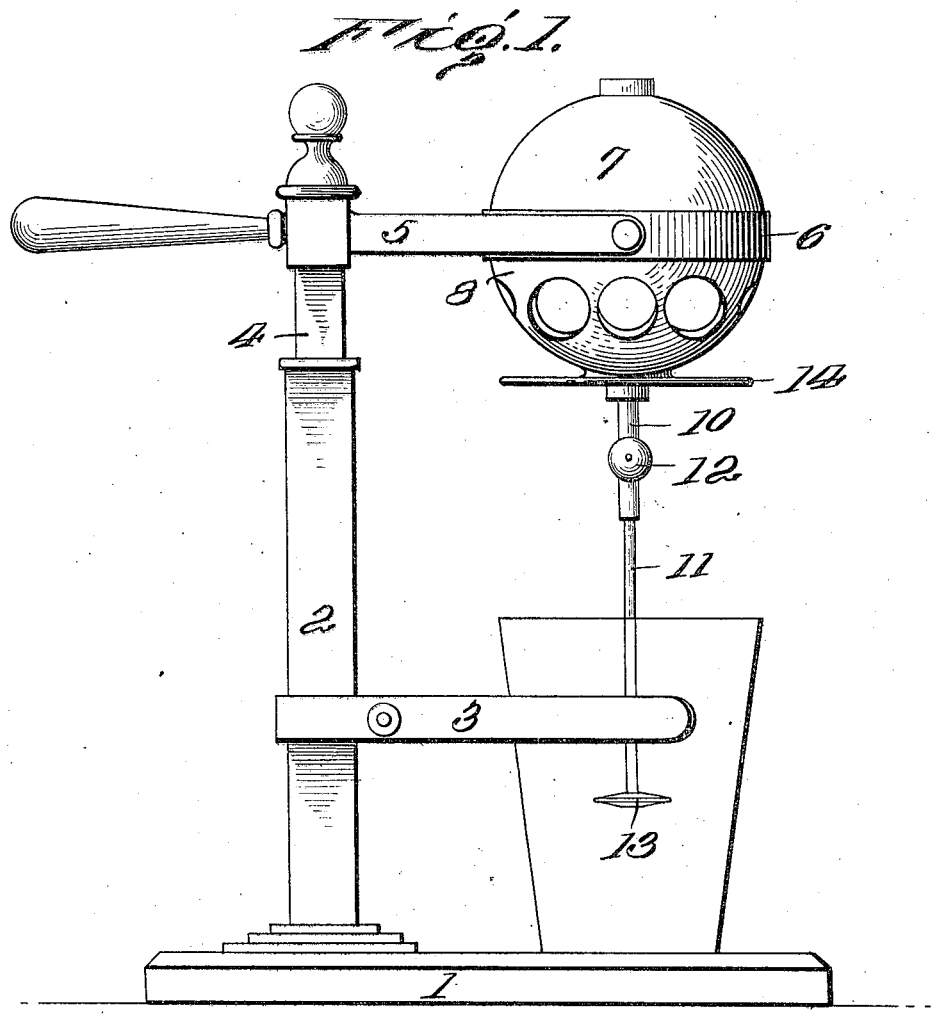
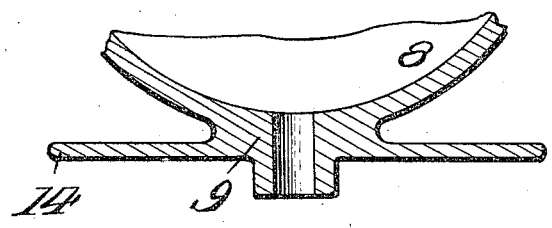
Inventor
H. T. Pierson.
By
Attorney Patented Feb. 27, 1923.

1,447,034

UNITED STATES PATENT OFFICE.

HUBERT TOWNLEY PIERSON, OF HOQUIAM, WASHINGTON.

GUARD FOR MOTOR HOUSINGS.

Application filed April 22, 1920. Serial No. 375,778.

*To all whom it may concern:*

Be it known that I, HUBERT T. PIERSON, a citizen of the United States, residing at Hoquiam, in the county of Grays Harbor and State of Washington, have invented certain new and useful Improvements in Guards for Motor Housings, of which the following is a specification, reference being had therein to the accompanying drawing.

This invention relates to a certain new and useful improvement in guards for motor housings used in connection with drink mixers, such as are used in soda water fountains and other places of the like, the object being to provide one section of the housing with an annular flange to form a guard in order to prevent the contents of the drink being mixed from being thrown into the housing so as to injure the motor therein.

A further object of the invention is to provide a guard which is preferably formed integral with the housing and extends outwardly above the agitator a sufficient distance to prevent the contents of the receptacle from being thrown against the housing.

Other and further objects and advantages of the invention will be hereinafter set forth and the novel features thereof defined by the appended claim.

In the drawings,

Figure 1 is a side elevation of a drink mixer showing my improved construction of housing; and Figure 2 is a detail section through the lower portion of the housing showing the guard.

In carrying out my invention I employ a base 1 on which is arranged a standard 2 provided with a glass holder 3 adapted to receive a receptacle of any kind in which the liquid to be mixed is placed in the ordinary manner. As herein shown the standard 2 is formed hollow and in which is slidably mounted a member 4 having a hanger 5 provided with suitable bearings for supporting a housing 6 which is preferably formed of two sections, an upper section 7 and a lower section 8, said housing having an electric motor of the ordinary construction now in use arranged therein not shown.

The lower section 8 of the housing is provided with the usual openings and has a boss 9 forming a bearing for the motor drive shaft 10 carrying an agitating shaft 11 connected thereto by the usual coupling 12. The agitating shaft is provided with an agitator 13, the above description being given so that the operation of my improved construction of guard with the housing can be clearly understood.

In operation drink mixers of this kind throw the contents of the liquid in the receptacle upwardly and the same is thrown through the openings in the housing which soon clogs the openings up and injures the electric motor arranged therein and the object of this invention is to provide a guard which will protect the housing. The boss 9 of the lower section of the housing is provided with an annular flange 14 forming a guard which can be formed of any desired size. This guard is formed integral with the housing section so that when the two sections of the housing are placed together and the motor installed therein, the housing proper will be protected from the liquid which is thrown upwardly in the receptacle being mixed.

While I have shown a particular construction of housing, I do not wish to limit myself to the details of construction as my invention consists in forming a housing with an annular flange to form a guard.

From the foregoing description it will be seen that I have provided the motor housing of a drink mixer with a guard which can be kept perfectly clean so as to provide a very sanitary mixing device which overcomes the disadvantages now existing in mixers of this kind.

What I claim is:—

A drink mixer having a motor enclosed in a housing, a depending shaft carried by said motor having an agitator carried thereby, the lower end of said housing being provided with a boss through which said shaft extends, and a circular guard formed integral with said boss for protecting the motor from the splash of the drink being mixed.

In testimony whereof I have hereunto affixed my signature in the presence of two witnesses.

HUBERT TOWNLEY PIERSON.

Witnesses:
 JAMES P. H. CALLAHAN,
 JENNIE O. HOAG.